United States Patent Office 3,631,169
Patented Dec. 28, 1971

3,631,169
3-(5-NITRO-2-FURYL)ISOXAZOLINE
DERIVATIVES
Shinsaku Minami, Yamato Kouriyama-shi, Jun-Ichi Matsumoto, Osaka, Masanao Shimizu, Kobe, and Yoshiyuki Takase, Amagasaki-shi, Japan, assignors to Dainippon Pharmaceutical Co., Ltd., Osaka, Japan
No Drawing. Filed Sept. 22, 1966, Ser. No. 581,192
Int. Cl. C07d 85/16, 99/02
U.S. Cl. 260—247.5 R                35 Claims

ABSTRACT OF THE DISCLOSURE 3-(5-nitro-2-furyl) isoxazoline derivatives having antibacterial and antiprotozoal activities of the formula:

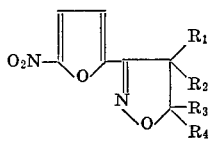

wherein $R_1$ represents a member selected from the groups consisting of hydrogen, benzyl, lower alkyl and lower alkoxycarbonyl; $R_2$ represents hydrogen or a lower alkyl group; $R_3$ represents a member selected from the group consisting of hydrogen,

(wherein R' and R" represent lower alkyl and R' and R" together with the nitrogen atom may form a heterocyclic ring selected from pyrrolidino, piperidino and morpholino), lower alkyl and lower alkoxy; $R_4$ represents a member selected from the groups consisting of hydrogen, lower alkyl, lower alkanoyl, phenyl, cyanomethyl, chloromethyl, pyridine, methyl pyridine, lower alkoxycarbonyl and

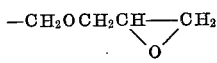

$R_1$ and $R_4$ together may form a bridge selected from the groups consisting of —(CH$_2$)$_3$—, —(CH$_2$)$_4$—,

—(CH$_2$)$_3$O— and

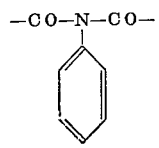

This invention concerns novel 3-(5-nitro-2-furyl)isoxazole derivatives having an excellent antibacterial and antiprotozoal activities, and methods of their preparation.

It has now been found that novel 3-(5-nitro-2-furyl) isoxazole derivatives expressed by the formula

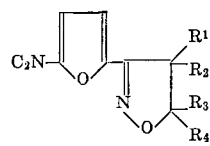

are less toxic in the human beings and animals, and have excellent antibacterial and antiprotozoal activities.

In Formula I, $R_1$ represents a hydrogen atom, lower alkyl, aryl, aralkyl, lower alkanoyl, aralkanoyl, arylcarbonyl, cyano, non-substituted or substituted carbamoyl, lower alkoxycarbonyl, acylamido, amino, nitro, cyanomethyl, halogenomethyl or 5 to 6-membered non-substituted or substituted heterocyclic group containing at least one nitrogen atom; $R_2$ represents a hydrogen atom or lower alkyl group; $R_3$ is a hydrogen atom, lower alkyl, lower alkoxy, lower alkanoyloxy, lower alkoxycarbonyl or

group (where R' and R" represent a hydrogen atom or lower alkyl and R' and R", when taken together, may form a non-substituted or substituted heterocyclic ring with the nitrogen atom); $R_2$ and $R_3$ together may represent a single bond; $R_4$ represents a hydrogen atom, lower alkyl, aryl, aralkyl, lower alkanoyl, cyano, non-substituted or substituted carbamoyl, lower alkoxycarbonyl, acylamido, amino, lower alkoxy, cyanomethyl, halogenomethyl, 5 to 6-membered non-substituted or substituted heterocyclic group having at least one nitrogen atom, lower alkoxymethyleneamino, or

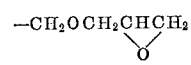

$R_1$ and $R_4$, when taken together, may be a non-substituted or substituted polymethylene group containing 3 to 5 carbon atoms; and the said polymethylene may be interrupted by one or more nitrogen, oxygen or sulfur atom.

The novel compounds of this invention are useful compounds, having excellent antiprotozoal activities against trichomonas vaginalis and strong antibacterial activities against such pathogenic Gram negative and Gram positive bacteria as Staphylococcus aureus and Shigella flexneri.

It is expected that the compounds will be useful for prophylaxis and therapy of infections caused by such pathogens and applicable in the fields of foods and agriculture.

The following table summarizes the in vivo activities of the compound of this invention against a variety of microorganisms. The minimum inhibitory concentration (MIC) was determined by the well-known serial dilution technique.

ANTIMICROBIAL ACTIVITY IN VITRO
[MIC: mcg./ml.]

| Compound | Staphlococcus aureus | Bacillus subtilis | Escherichia coli | Shigella flexneri 2a | Shigella sonnei | Salmonella typhimurium | Klebsiella pneumoniae | Mycobacterium tuberculosis | Trichomonas vaginali |
|---|---|---|---|---|---|---|---|---|---|
| 5-amino-3-(5-nitro-2-furyl)-4-isoxaazolecarbonamide | 10 | 0.1 | 0.3 | 1 | 0.3 | 0.3 | 0.1 | 10 | 1 |
| 4,5-dihydro-3-(5-nitro-2-furyl)-4-isoxazolecarbonamide | 10 | 1 | 1 | 1 | 1 | 1 | 1 | 1 | 30 |
| 4,5-dihydro-6-methyl-3-(5-nitro-2-furyl)-4-oxoisoxazolo[5,4-d]pyrimidine | 3 | 0.1 | 1 | 1 | 0.3 | 1 | 0.1 | 10 | 0.3 |
| 5-ethoxymethyleneamino-3-(5-nitro-2-furyl)-4-isoxazolecarbonitrile | 1 | 0.1 | 0.1 | 0.3 | 0.1 | 0.2 | 0.2 | 3 | 1 |
| 4,5-dihydro-3-(5-nitro-2-furyl)-5-piperidino-4,5-tetramethyleneisoxazole | 10 | 0.3 | 3 | 10 | 1 | 3 | 1 | 0.01 | 10 |
| 4,5-dihydro-3-(5-nitro-2-furyl)-5-pyrrolidino-4,5-tetramethyleneisoxazole | 10 | 1 | 1 | 10 | 1 | 3 | 1 | 0.01 | 3 |
| 3-(5-nitro-2-furyl)-4,5-tetramethyleneisoxazole | 10 | 1 | 1 | 10 | 1 | 1 | 1 | 1 | 3 |
| 4,5-dihydro-3-(5-nitro-2-furyl)-5-phenyl-5-piperidinoisoxazole | 0.3 | 1 | >100 | >100 | | | | 10 | 3 |
| 5-cyanomethyl-4,5-dihydro-3-(5-nitro-2-furyl)isoxazole | 3 | | 1 | 1 | | | | 3 | 1 |
| 3-(5-nitro-2-furyl)-5-(3-pyridyl)isoxazole | 10 | 10 | 1 | 10 | 1 | 3 | | | |
| 5-diethylamino-4,5-dihydro-4-ethyl-3-(5-nitro-2-furyl)-isoxazole | 30 | 10 | 1 | 10 | 1 | 3 | 0.22 | 0.1 | 3 |
| 4-ethyl-3-(5-nitro-2-furyl)-isoxazole | 10 | 3 | 1 | 3 | 0.3 | 1 | 0.1 | 0.3 | 3 |
| 4-acetyl-5-methyl-3-(5-nitro-2-furyl)isoxazole | 30 | 0.03 | 1 | 3 | 1 | 1 | 0.3 | 30 | 1 |
| 5-amino-3-(5-nitro-2-furyl)-4-isoxazolecarbonitrile | 1 | 0.03 | 0.1 | 0.1 | 0.1 | 0.3 | 0.03 | 3 | 0.3 |
| Methyl 5-amino-3-(5-nitro-2-furyl)-4-isoxazolecarboxylate | >100 | 0.03 | 0.3 | 1 | 0.1 | 1 | 0.03 | 10 | 1 |
| 3-(5-nitro-2-furyl)isoxazole | 3 | 1 | 1 | 1 | 1 | 1 | 1 | 1 | 1 |
| 4,5-dihydro-3-(5-nitro-2-furyl)-5-piperidino-4,5-tetramethyleneisoxazole hydrochloride | 10 | 3 | 3 | 10 | 1 | 3 | 0.3 | 0.03 | 30 |
| 3-(5-nitro-2-furyl)-4-phenyl-isoxazole | 1 | 0.1 | 1 | 3 | 1 | 3 | 1 | 3 | 1 |
| 5-acetyl-4,5-dihydro-3-(5-nitro-2-furyl)isoxazole | 10 | | 3 | 3 | | | | 3 | 3 |
| Ethyl 5-amino-3-(5-nitro-2-furyl)-4-isoxazolecarboxylate | 10 | 0.03 | 1 | 3 | 0.3 | 1 | 0.3 | 30 | 3 |
| 4,5-dihydro-3-(5-nitro-2-furyl)-4-phenyl-5-piperidinoisoxazole | 10 | 1 | 10 | 30 | | | | 3 | 30 |
| 4-methyl-3-(5-nitro-2-furyl)-isoxazole | 10 | 1 | 0.3 | 0.3 | 0.3 | 1 | 0.3 | 1 | 1 |

The following table summarizes the in vivo activities of the compounds of this invention against infection with salmonella typhimurium.

THERAPEUTIC EFFECT IN MICE

Organism: *Salmonella typhimurium*. Route of infection: i.p. Route of administration: p.o. i.p.
[Survived/tested]

| | Compound [2] | | | | | | | | | | |
|---|---|---|---|---|---|---|---|---|---|---|---|
| | (1) | | (2) | | (3) | | (4) | | (5) | | (6) | |
| Route | I.p. | P.o. | I.p. | P.o. | I.p. | P.o. | I.p. | P.o. | I.p. | P.o. | I.p. | P.o. |
| Dose[1], mg./kg.: | | | | | | | | | | | | |
| 50 | 7/10 | 8/10 | 8/10 | 6/10 | | | | | 8/10 | 9/10 | 9/10 | 6/10 |
| 25 | | | | | 10/10 | 10/10 | 5/10 | 1/10 | 4/10 | 6/10 | 6/10 | |
| 12.5 | | | | | 9/10 | 6/10 | | | 0/10 | 5/10 | | |
| 6.25 | | | | | 7/10 | 4/10 | | | | 2/10 | | |
| 3.2 | | | | | 4/10 | 0/10 | | | | 0/10 | | |

[1] 2 times per day for 4 days.
[2] Compounds: (1) = 3-(5-nitro-2-furyl)-5-(3-pyridyl)isoxazole. (2) = 5-cyanomethyl-4,5-dihydro-3-(5-nitro-2-furyl)isoxazole. (3) = 5-amino-3-(5-nitro-2-furyl)-4-isoxazolecarbonitrile. (4) = 5-amino-3-(5-nitro-2-furyl)-4-isoxazolecarbonamide. (5) = 4,5-dihydro-3-(5-nitro-2-furyl)-4-isoxazolecarbonamide. (6) = 5-ethoxymethyleneamino-3-(5-nitro-2-furyl)-4-isoxazolecarbonitrile.

NOTE.—Survival rate of non-treated control was 0/10.

The novel compounds of this invention show less toxicity. For instance, $LD_{50}$ of 5-amino-3-(5-nitro-2-furyl)-4-isoxazolecarbonitrile is 2000 mg./kg. when administered intraperitoneally, and more than 2000 mg./kg. when administered orally.

The method of the preparation of the novel compounds of this invention will now be explained.

5-nitro-2-furhydroxamoyl halide and an equimolar or slightly excess amount of an ethylenic compound as stated below are subjected to the cycloaddition reaction in the presence of an hydrogen halide acceptor to form easily the novel 3-(5-nitro-2-furyl)isoxazole derivatives of the invention.

In the ethylenic compound represented by the formula

(II)

$R_1$ and $R_4$ are as defined in the Formula I; $R'_2$ represents a hydrogen atom, or lower alkyl; $R'_3$ represents a hydrogen atom, lower alkyl, lower alkoxy, lower alkanoyloxy, lower alkoxycarbonyl or $$-N{<}^{R'}_{R''}$$

group (where R' and R" show a hydrogen atom or lower alkyl and R' and R", when taken together, may form a non-substituted or substituted heterocyclic ring with nitrogen atom).

In this reaction leading to the compounds (I), either 5-nitro-2-furhydroxamoyl halide or 5-nitro-2-furonitrile oxide equivalently is applicable as a starting material, since the former is easily convertible into the latter in presence of the hydrogen halide acceptor. In the case of using 5-nitro-2-furonitrile oxide, therefore, the hydrogen halide acceptor is not necessary for the reaction. The reaction sequence (A) is illustrated as follows;

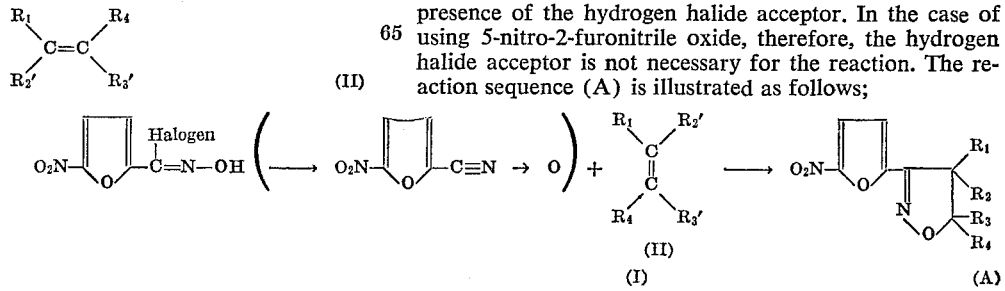

(wherein $R_1$, $R_2$, $R_3$, $R_4$, $R'_2$ and $R'_3$ are as defined in the Formula I and II).

The above-mentioned reaction is generally carried out in an inert organic solvent with the reactants maintained in the form of suspension or solution. The solvent to be used for the reaction should be chosen according to the properties of the reactants, thus generally speaking, a variety of organic solvents such as alkanols, for instance, methanol and ethanol, halogenoalkanes, for instance, chloroform and carbon tetrachloride, ether, tetrahydrofuran, dioxanes, benzene, toluene, xylene, dimethylformamide, and dimethylsulfoxide are used. Nevertheless, preferable are such non-polar or less polar solvents as chloroform, ether and benzene. If the starting ethylenic compound is liquid, it can concurrently serve as a solvent.

Organic and inorganic bases are used as the hydrogen halide acceptor of this invention, especially preferable being alkali hydroxide, alkali salts of organic or weak inorganic acids, ammonia, and amines such as pyridine, trimethylamine and triethylamine.

The reaction proceeds smoothly under mild conditions, such as at a temperature of 0 to 150° C., and can be completed in a short period of time.

Of the compounds prepared in accordance with the above reaction (A), 4,5-dihydro-3-(5-nitro-2-furyl)isoxazole derivatives expressed by the formula

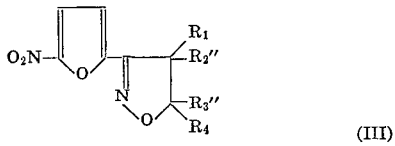

(III)

(wherein $R_1$ and $R_4$ are as defined in Formula I; $R''_2$ represents a hydrogen atom; $R''_3$ represents a hydrogen atom, lower alkoxy, lower alkanoyloxy or

group, in which R' and R" represent a hydrogen atom or lower alkyl and R' and R" together may form a non-substituted heterocyclic ring with the nitrogen atom) can be converted by the method known per se into their derivatives as shown in the following Formula IV in which a double bond is formed between the 4- and 5-positions of the 4,5-dihydro isoxazole ring

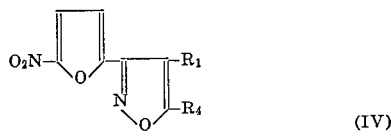

(IV)

(wherein $R_1$ and $R_4$ are as defined in Formula I. This means that a single bond is formed of $R''_2$ and $R''_3$.

The starting compounds of the Formula III to be used are not necessary isolated during the prior reaction (A) and thus the present reaction can be effected for the compounds, isolated or not by the following methods.

A compound (III) in which both $R''_2$ and $R''_3$ are a hydrogen atom, is dehydrogenated with a dehydrogenation reagent such as chloranil, dichlorodicyanobenzoquinone and particularly N-bromosuccinimide in an inert solvent to form the corresponding isoxazole derivative as expressed in the Formula IV. If chloranil or dichlorocyanobenzoquinone is used, alcohols, for instance, tert-butanol, and dioxane are advantageously used as a solvent. When N-bromosuccinimide is used, the reaction is carried out in a non-polar or less polar solvent such as carbon tetrachloride, carbon disulfide, benzene and chloroform under the irradiation of ultraviolet rays if desired.

On the other hand, a compound (III) in which $R''_2$ is a hydrogen atom and $R''_3$ is the group except a hydrogen atom is allowed to react with an acid at room temperature or at mildly elevated temperature to afford the corresponding isoxazole derivatives (IV) with the elimination of an amine, alcohol, or carboxylic acid depending on $R''_3$.

As the preferable acids used in this case, there are mentioned mineral acids such as hydrochloric and sulfuric acid, Lewis acids such as borontrifluoride, aluminum chloride and organic acids such as p-toluene sulfonic acid. As the solvent, preferable are water, alkanols, acetone, tetrahydrofuran, dioxane, dimethylsulfoxide, and dimethylformamide.

Some of the isooxazole derivatives of the invention shown by Formula I wherein $R_2$ and $R_3$ together form a single bond, that is, the derivatives expressed by the formula

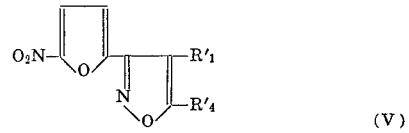

(V)

(wherein $R'_1$ is a cyano, lower alkoxycarbonyl or —COR group, in which R is a lower alkyl, aralkyl or aryl group; and $R'_4$ is an amino, lower alkoxy, lower alkyl, aralkyl or aryl group) can also be prepared by the reaction of 5-nitro-2-furhydroxamoyl halide or 5-nitro-2-furonitrile oxide with an equimolar or slightly excess amount of a compound of the formula $$Y—CH_2—Y' \qquad (VI)$$

in the presence of alkali metal alkoxide or hydroxide. In Formula VI, Y and Y' may be the same or different, and represent a cyano, alkoxycarbonyl or —COR group, in which R represents a lower alkyl, aryl or aralkyl group. One of Y and Y' reacts so as to form a ring, and gives the intended product with ease. The reaction is formulated as follows:

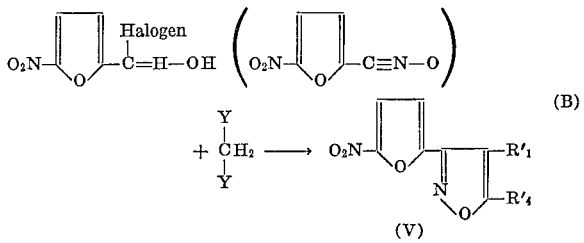

(B)

(wherein Y, Y', $R'_1$ and $R'_4$ are as defined in Formulas VI and V). As the alkali metal alkoxide, there are mentioned alkoxides prepared from such alkali metal as sodium and potassium with lower alcohols, and as the alkali metal hydroxide, sodium hydroxide and potassium hydroxide are named. For the alcohol to be used in the preparation of the alkoxide, it is desirable to use an alcohol of the same kind as a reaction medium. This reaction is carried out at a temperature in the range of about —5 to 100° C., preferably 0 to 30° C., but other conditions are the same as those for the reaction (A). The mechanism of this reaction is illustratively shown as follows.

(a)

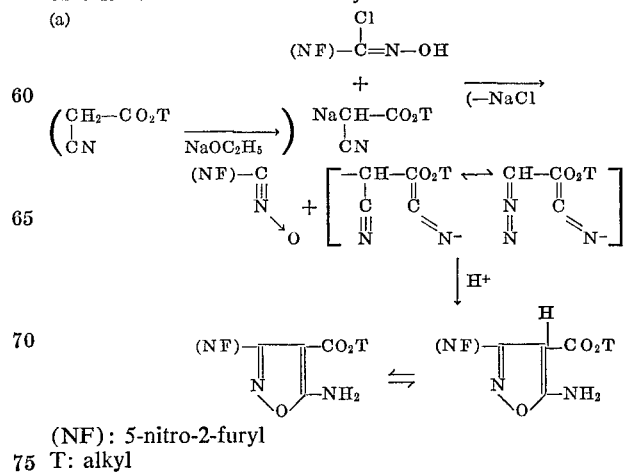

(NF): 5-nitro-2-furyl
T: alkyl (b)

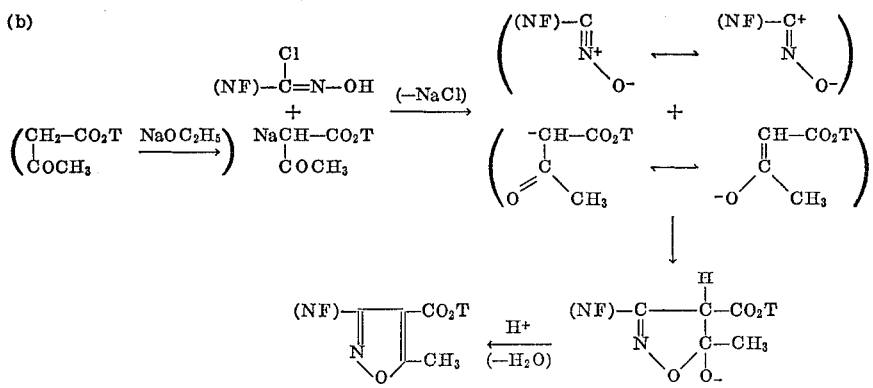

(NF): 5-nitro-2-furyl
T: alkyl

In the ring formation, the predominance of the participation of Y and Y', if they are different functional groups, is depend upon both characters of the two groups given and, however, may, in general, be anticipated according to priority of the groups as follows:

—COR>—CN>—COO-akyl

With respect to —COR, the order is

—CO-aryl>—CO-alkyl

In formula V, $R'_4$ represents a group derived from Y or Y' which has participated in the ring formation. When Y of Y' is —COR, —CN and —COO-alkyl, $R'_4$ is —R, —NH$_2$ and —O-alkyl respectively. On the other hand, $R'_1$ is Y or Y' itself which has not participated in the ring formation.

We have so far explained a general method of preparing the novel compounds of this invention. In the following are given methods of preparing specific novel compounds of the invention.

4,5-dihydro-3-(5-nitro - 2 - furyl)-4-oxoisoxazolo [5,4-d] pyrimidine or 6-alkyl-4,5-dihydro-3-(5-nitro-2-furyl)-4-oxoisoxazolo [5,4-d] pyrimidine can be prepared by reaction of 5-amino-3-(5-nitro-2-furyl)-4-isoxazolecarbonamide with alkyl orthocarboxylate to thereby induce ring formation. This reaction is carried out at room temperature or refluxing temperature and, if desired, on addition of acetic anhydride. The reaction proceeds as follows:

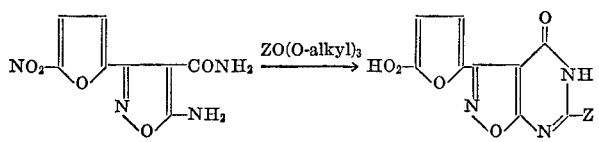

(wherein Z represents a hydrogen atom or alkyl group).

5-alkoxymethyleneamino-3-(5-nitro - 2 - furyl)-4-isoxazolecarbonitrile can be prepared by the reaction of 5-amino-3-(5-nitro - 2-furyl)-4-isoxazolecarbonitrile with alkyl ortho-formate under the same reaction conditions as used in the above-mentioned reaction. The reaction proceeds as follows:

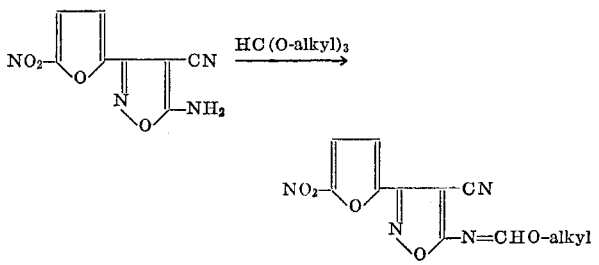

Acylation of 5-amino-3-(5-nitro-2-furyl)isoxazole derivatives with an acylating agent, as usual manner, results in a formation of a corresponding acylated compound, for instance, ethyl 5-acetamido-3-(5-nitro-2-furyl)-4-isoxazolecarboxylate.

Of the 5-amino-3-(5-nitro-2-furyl)isoxazole derivatives, 5-amino-3-(5-nitro - 2 - furyl)-4-isoxazolecarbonitrile and 5-amino-3-(5-nitro - 2 - furyl) - 4 - isoxazolecarbonamide are acylated to give corresponding acylated compound, from which, by the ring formation, 6-alkyl-4,5-dihydro-3-(5-nitro-2-furyl)-4-oxoisoxazolo [5,4-d] pyrimidine is obtained. This reaction is also carried out at room temperature or at refluxing temperature. The acylating agent to be used includes a mixture of carboxylic anhydride and p-toluenesulfonic acid, a mixture of iso-propenyl acetate and p-toluenesulfonic acid, or a mixture of alkanoyl chloride and pyridine. When a mixture of iso-propenyl acetate and p-toluenesulfonic acid is used in this case, there is mainly obtained the corresponding acetylated compound. This reaction is expressed as follows.

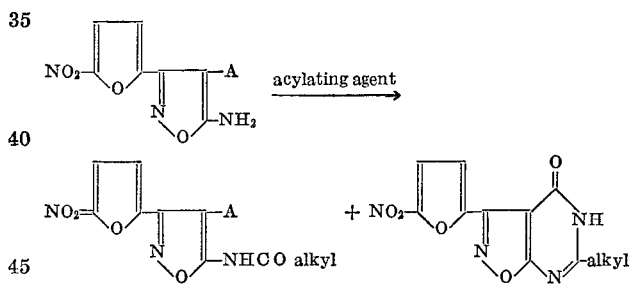

(wherein A represents CN or CONH$_2$).

5-amino-3-(5-nitro - 2 - furyl)-4-isoxazolecarbonamide can be obtained by the hydrolysis of 5-amino-3-(5-nitro-2-furyl)-4-isoxazole-carbonitrile as usual manner.

With respect to every substituent expressed by a generic term in the foregoing, its specific groups and preferable ones are given below.

Lower alkyl: lower alkyl having 1–4 carbon atoms such as methyl, ethyl, isobutyl and sec-butyl, preferable being methyl, ethyl and isobutyl.

Alkanoyl: acetyl, propionyl, n-butanoyl, and isobutanoyl, preferable being acetyl and propionyl.

Aralkanoyl: phenylacetyl and 3-phenylpropionyl.

Arylcarbonyl: benzoyl (whose o-, m- or p-position may be substituted by nitro, amino, halogen such as chlorine, iodine and fluorine), preferable being benzoyl and p-chlorobenzoyl.

Halogenomethyl: chloromethyl, iodomethyl, bromomethyl, and fluoromethyl.

Lower alkoxy: alkoxy having 1–3 carbon atoms such as methoxy, ethoxy, isopropoxy and n-propoxy.

Acylamido: acetylamido, propionylamido, and benzoylamido.

Lower alkoxymethyleneamino: methoxymethyleneamino, ethoxymethyleneamino, n-propoxymethyleneamino, and iso-propoxymethyleneamino.

Lower alkoxycarbonyl: methoxycarbonyl, ethoxycarbonyl, n-propoxycarbonyl, and iso-propoxycarbonyl.

Non-substituted and substituted carbamoyl: carbamoyl;

lower alkyl-substituted carbamoyl having 1–3 carbon atoms such as methylcarbamoyl, ethylcarbamoyl, n-propylcarbamoyl, iso-propylcarbamoyl, dimethylcarbamoyl and diethylcarbamoyl; phenylcarbamoyl (whose o-, m- or p-position may be substituted with halogen such as bromine, chlorine, iodine and fluorine, hydroxy, nitro, amino, a lower alkyl with 1–3 carbon atoms such as methyl, ethyl, isopropyl, and n-propyl); and N-lower alkyl N-phenylcarbamoyl such as N-methyl-N-phenylcarbamoyl (whose o-, m- or p-position may be substituted by nitro, hydroxy, amino, halogen such as bromine, chlorine, iodine, fluorine, a lower alkyl with 1–3 carbon atoms such as methyl, ethyl, isopropyl, and n-propyl; preferable being phenylcarbamoyl, p-chlorophenylcarbamoyl, methylcarbamoyl, ethylcarbamoyl, iso-propylcarbamoyl, and n-propylcarbamoyl.

Aryl: phenyl, 1-naphthyl, 2-naphthyl (phenyl, naphthyl group may be substituted by amino, lower alkoxy such as methoxy, ethoxy and isopropoxy, or halogen such as chlorine, bromine, fluorine, and iodine), preferable being phenyl, o-aminophenyl, m-aminophenyl, p-aminophenyl, o-chlorophenyl, m-chlorophenyl, and p-chlorophenyl.

Aralkyl: benzyl, phenethyl (the phenyl radical of these groups may be substituted at o-, m- or p-position by a lower alkyl with 1–3 carbon atoms such as methyl, ethyl and n-propyl, halogen such as chlorine, bromine, iodine, and fluorine, nitro, amino, hydroxy), preferable being benzyl, o-chlorobenzyl, m-chlorobenzyl, p-chlorobenzyl, o-aminobenzyl, m-aminobenzyl, and p-aminobenzyl.

amino substituted by a lower alkyl with 1–3 carbon atoms such as methylamino, ethylamino, n-propylamino, iso-propylamino, dimethylamino, diethylamino and di-isopropylamino, and heterocyclic groups such as piperidino, morpholino, pyrrolidino, and piperadino, preferable being diethylamino, dimethylamino, piperidino, morpholino, and pyrrolidino.

5 to 6-membered non-substituted or substituted heterocyclic group containing at least one atom: 2-pyridyl, 3-pyridyl, 4-pyridyl and N-oxide of these; 2-quinolyl, 3-quinolyl, 6-quinolyl, 7-quinolyl, and N-oxide of these; 1-pyrrolyl, 2-pyrrolyl, 3-pyrrolyl, 1-morpholinyl, 2-morpholinyl, 3-morpholinyl, 1-piperidyl, 2-piperidyl, 3-piperidyl, 4-piperidyl, 2-pyrimidinyl, 4-pyrimidinyl, 5-pyrimidinyl, 1-pyrrolidinyl, 2-pyrrolidinyl, 3-pyrrolidinyl, 2-thiazolyl, 4-thiazolyl, 2-benzothiazolyl, 5-benzothiazolyl (each ring may be substituted by a lower alkyl with 1–3 carbon atoms such as methyl, ethyl, and n-propyl, and halogen such as chlorine, bromine, and iodine), preferable being 2-pyridyl, 3-pyridyl, 4-pyridyl, 2-methyl-5-pyridyl, 2-quinolyl, and 4-quinolyl.

Below are given examples of the preparation of the novel compounds in accordance with this invention.

EXAMPLE 1

Metallic sodium (0.23 g.) was dissolved in 10 ml. of anhydrous methanol. After cooling, 0.99 g. of methyl cyanoacetate was added. The resulting solution was added dropwise to a solution of 1.9 g. of 5-nitro-2-furhydroxamoyl chloride in 15 ml. of anhydrous methanol while stirring under cooling. The stirring was continued for 1 hour at room temperature. The precipitated crystals were collected by filtration, washed with water, and recrystallized from acetone. There was obtained 0.7 g. of methyl 5-amino-3-(5-nitro-2-furyl)-4-isoxazolecarboxylate with a melting point of 249 to 251° C. (decomposition).

EXAMPLE 2

A solution composed of 5 ml. of anhydrous ethanol, 0.23 g. of metallic sodium and 1.13 g. of ethyl cyanoacetate of and 10 ml. of a solution of 1.9 of 5-nitro-2-furhydroxamoyl chloride in 10 ml. of anhydrous ethanol were treated in the same manner as in Example 1. The resulting product was recrystallized from ethanol to give 1.2 g. of ethyl 5 - amino-3-(5-nitro-2-furyl)-4-isoazolecarboxylate with a melting point of 204 to 206° C.

EXAMPLE 3

A suspension of 20 ml. of anhydrous ethanol, 0.69 g. of metallic sodium and 1.98 g. of malononitrile and a solution of 5.7 g. of 5-nitro-2-furhydroxamoyl chloride in 30 ml. of anhydrous ethanol were treated in the same manner as in Example 1. The resulting product was recrystallized from an ethanol-acetone solution to give 3,2 g. of 5-amino-3-(5-nitro-2-furyl)-4-isoxazolecarbonitrile with a melting point of 245 to 247° C. (decomposition).

EXAMPLE 4

A solution of 6 ml. of anhydrous methanol, 0.23 g. of metallic sodium, and 1.16 g. of methyl acetoacetate and a solution of 1.9 g. of 5-nitro-2-furhydroxamoyl chloride in 5 ml. of anhydrous methanol were treated in the same manner as in Example 1. The resulting product was recrystallized from ethanol to give 1.3 g. of methyl 5-methyl-3-(5-nitro-2-furyl)-4-isoxazolecarboxylate with a melting point of 121 to 122° C.

EXAMPLE 5

A suspension of 10 ml. of anhydrous ethanol, 0.23 g. of metallic sodium, and 10 g. of acetyl acetone and a solution of 1.9 of 5-nitro-2-furhydroxamoyl chloride in 10 ml. of anhydrous ethanol were treated in the same manner as in Example 1. The resulting product was recrystallized from methanol to give 1.4 g. of 4-acetyl-5-methyl-3-(5-nitro-2-furyl)-isoxazole with a melting point of 111 to 113° C.

EXAMPLE 6

Granular potassium hydroxide (0.28 g.) was dissolved in ethanol (a small amount of water may be added), and the resulting solution was added to a solution of 0.5 g. of acetyl acetone in 5 ml. of ethanol. A suspension was added dropwise to a solution of 0.95 g. of 5-nitro-2-furhydroxamoyl chloride in 5 ml. of ethanol, and treated in the same manner as in Example 1. The resulting product was recrystallized from ethanol to give 0.6 g. of 4-acetyl-5-methyl-3-(5-nitro-2-furyl) isoxazole.

From different starting material the following compounds were obtained.

Ethyl 3-(5-nitro-2-furyl)-5-phenyl-4-isoxazolecarboxylate (M.P. 99–100° C.)
Ethyl 5 - methyl-3-(nitro-2-furyl)-4-isoxazolecarboxylate (M.P. 81–82° C.)
4 - acetyl-3-(5-nitro-2-furyl)-5-phenylisoxazole (M.P. 131–132° C.)
3 - (5-nitro-2-furyl)-5-phenyl-4-isoxazolecarbonitrile (M.P. 177–179° C.)

EXAMPLE 7

5-nitro-2-furhydroxamoyl chloride (1.9 g.) was dissolved in 65 ml. of chloroform, and 1.5 g. of 1-pyrrolidinocyclohexene and then 1.0 g. of triethylamine were added. The reaction mixture was refluxed for 30 minutes, and the chloroform was removed by distillation under reduced pressure. Ethanol was added to the residue and the mixture. The resulting crystals were recovered by filtration, washed with water, and recrystallized from ethanol to give 1.6 g. of needle-like crystals of 4,5-dihydro-3-(5-nitro-2-furyl) - 5 - pyrrolidino-4,5-tetramethyleneisoxazole with a melting point of 115 to 116° C.

EXAMPLE 8

A solution of 1.9 g. of 5-nitro-2-furhydroxamoyl chloride, 1.7 g. of 1-morpholinocyclohexene and 1.0 g. of triethylamine in 60 ml. of chloroform was refluxed for 50 minutes, and then treated in the same manner as in Example 7. The resulting product was recrystallized from ethanol to give 2.2 g. of yellow crystals of 4,5-dihydro-5-morpholino-3-(5-nitro-2-furyl) - 4,5 - tetramethyleneisoxazole with a melting point of 158 to 160° C.

EXAMPLE 9

5-nitro-2-furhydroxamoyl chloride (0.95 g.), 0.82 g. of 1-piperidinocyclohexene and 0.51 g. of triethylamine were allowed to react in 60 ml. of benzene in the same manner as in Example 7. There was obtained 0.95 g. of 4,5-dihydro-3-(5-nitro-2-furyl) - 5 - piperidino-4,5-tetramethyleneisoxazole in light yellow crystals with a melting point of 126 to 129° C.

A mixture of 8 ml. of 30% hydrochloric acid and 3 ml. of ethanol was added to the obtained 4,5-dihydro-3-(5-nitro-2-furyl) - 5-piperidino-4,5-tetramethyleneisoxazole, and the resulting solution was refluxed for 30 minutes on a steam bath. The crystals precipitated by cooling were collected by filtration, and recrystallized from a mixture of ethanol, acetone and water. There was obtained 0.3 g. of 4,5-dihydro-3-(5-nitro-2-furyl)-5-piperidino-4,5-tetramethyleneisoxazole hydrochloride with a melting point of 160 to 162° C.

EXAMPLE 10

5-nitro-2-furhydroxamoyl chloride (1.9 g.), 1.9 g. of alphapiperidinostyrene and 1.0 g. of triethylamine were allowed to react in 60 ml. of chloroform in the same manner as in Example 7 to give 2.3 g. of yellow crystals of 4,5-dihydro-3-(5-nitro-2-furyl) - 5 - phenyl-5-piperidinoisoxazole with a melting point of 147 to 149° C.

EXAMPLE 11

5-nitro-2-furhydroxamoyl chloride (1.9 g.), 1.6 g. of 3-morpholino-2-pentene and 1.0 g. of triethylamine were allowed to react in 60 ml. of chloroform in the same manner as in Example 7 to give 1.8 g. of yellow crystals of 4,5-dihydro-5-ethyl-4-methyl-5-morpholino-3-(5 - nitro-2-furyl)isoxazole with a melting point of 152 to 153° C.

EXAMPLE 12

To a solution of 1.9 g. of 5-nitro-2-furhydroxamoyl chloride, and 1.9 g. of 1-morpholino-1-(3-pyridyl)-ethylene in 20 ml. of chloroform was added a chloroform solution of 1.0 g. of triethylamine, and the mixture was treated in the same manner as in Example 7. There was obtained 1.4 g. of pale yellow crystals of 4,5-dihydro-5-morpholino-3-(5-nitro-2-furyl)-5-(3 - pyridyl)isoxazole with a melting point of 195 to 197° C.

From different starting materials, the following compounds were obtained.

4,5-dihydro-3-(5-nitro-2-furyl) - 5 - pyrrolidino-4,5-trimethyleneisoxazole with a melting point of 129 to 131° C. was obtained from 5-nitro-2-furohydroxamoyl chloride and 1-pyrrolidino-cyclopentene.

4,5-dihydro-4-methyl-3-(5 - nitro-2-furyl)-5-piperidioisoxazole with a melting point of 104 to 106° C. was obtained from 5-nitro-2-furhydroxamoyl chloride and 1-piperidino-1-propylene.

4,5-dihydro - 3 - (5-nitro-2-furyl)-4-phenyl-5-piperidinoisoxazole with a melting point of 153 to 155° C. was obtained from 5-nitro-2-furhydroxamoyl chloride and beta-piperidino-styrene.

4-benzyl-4,5-dihydro - 5 - morpholino-3-(5 - nitro-2-furyl)isoxazole with a melting point of 131 to 132° C. was obtained from 5-nitro-2-furhydroxamoyl chloride and 1-morpholino-3-phenyl-1-propylene.

4,5-dihydro - 5 - isobutyl-3-(5-nitro-2-furyl)-5-pyrrolidinoisoxazole with a melting point of 116 to 119° C. from 5-nitro-2-furhydroxamoyl chloride and 4-methyl-2-pyrrolidino-1-pentene.

4,5-dihydro-5-ethyl-3-(5-nitro - 2 - furyl)-5-piperidinoisoxazole with a melting point of 133 to 136° C. was obtained from 5-nitro-2-furhydroxamoyl chloride and 2-piperidino-1-butene.

4,5-dihydro - 3 - (5-nitro-2-furyl)-5-piperidino-5-(2-pyridyl)isoxazole with a melting point of 160 to 163° C. was obtained from 5-nitro-2-furhydroxamoyl chloride and 1-piperidino-1-(2-pyridyl)ethylene.

4,5-dihydro-3-(5-nitro - 2 - furyl)-5-piperidino-5-(4-pyridyl)isoxazole with a melting point of 180° C. (decomposition) was obtained from 5-nitro-2-furhydroxamoyl chloride and 1-piperidino-1-(4-pyridyl)-ethylene.

EXAMPLE 13

A mixture of 2.5 ml. of conc. hydrochloric acid and 1 ml. of ethanol was added to 0.72 g. of 4,5-dihydro-3-(5-nitro-2-furyl) - 5 - pyrrolidino-4,5-tetramethyleneisoxazole, and the reaction mixture was heated for 10 minutes on a steam bath. After cooling, the precipitated crystals were collected by filtration, washed with water and recrystallized from ethanol-water. There was obtained 0.6 g. of 3-(5-nitro-2-furyl)-4,5-tetramethyleneisoxazole with a melting point of 126 to 128° C.

EXAMPLE 14

A mixture of 10 ml. of conc. hydrochloric acid and 4 ml. of ethanol was added to 0.5 g. of 4,5-dihydro-5-morpholino-3-(5 - nitro-2-furyl)-4,5-tetramethyleneisoxazole, and the reaction mixture was heated for 30 minutes on a steam bath and then cooled, and water was added. The precipitated crystals were collected by filtration, washed with water, and recrystallized from ethanol. There was obtained 0.2 g. of 3-(5-nitro-2-furyl)-4,5-tetramethyleneisoxazole.

EXAMPLE 15

Two ml. of conc. hydrochloric acid and 2 ml. of ethanol were added to 0.5 g. of 4,5-dihydro-3-(5-nitro-2-furyl)-5-phenyl-5-piperidinoisoxazole, and the mixture was heated for 20 minutes on a steam bath and then cooled, and water was added. The precipitated crystals were collected by filtration, washed with water, and recrystallized from ethanol-acetone. There was obtained 0.35 g. of yellow crystals of 3-(5-nitro-2-furyl)-5-phenylisoxazole with a melting point of 204 to 205° C.

EXAMPLE 16

A mixture of 2 ml. of conc. hydrochloric acid and 3 ml. of ethanol was added to 0.5 g. of 4,5-dihydro-5-ethyl-4 - methyl-5-morpholino-3-(5-nitro-2-furyl)isoxazole, and the reaction mixture was heated for 15 minutes on a steam bath. After cooling, the precipitated crystals were collected by filtration, washed with water, and recrystallized from ethanol. There was obtained 0.3 g. of 5-ethyl-4-methyl-3-(5-nitro-2-furyl)isoxazole in colourless crystals with a melting point of 110° C.

EXAMPLE 17

A mixture of 2 ml. of conc. hydrochloric acid and 3 ml. of ethanol was added to 0.5 g. of 4,5-dihydro-5-morpholino-3-(5 - nitro-2-furyl)-5-(3-pyridyl)isoxazole. The reaction mixture was heated for 30 minutes on a steam bath and after cooling, neutralized with sodium bicarbonate. The precipitated crystals were collected by filtration, washed with water, and recrystallized from acetone. There was obtained 0.23 g. of 3-(5-nitro-2-furyl)-5-(3-pyridyl)isoxazole in pale yellow crystals with a melting point of 194 to 195° C.

The following compounds were prepared in the same manner from different starting materials.

3-(5-nitro-2-furyl)-5-(2-pyridyl)isoxazole with a melting point of 80 to 82° C. was obtained from 4,5-dihydro-3-(5-nitro-2-furyl)-4-phenyl-5-piperidinoisoxazole.

4 - methyl-3-(5-nitro-2-furyl)isoxazole with a melting point of 146 to 149° C. was obtained from 4,5-dihydro-4-methyl-3-(5-nitro-2-furyl)-5-piperidinoisoxazole.

5-isobutyl-3-(5-nitro-2-furyl)isoxazole with a melting point of 99 to 100° C. was obtained from 4,5-dihydro-5-isobutyl-3-(5-nitro-2-furyl)-5-pyrrolidinoisoxazole.

5-ethyl-3-(5-nitro-2-furyl)isoxazole with a melting point of 137 to 140° C. was obtained from 4,5-dihydro-5-ethyl-3-(5-nitro-2-furyl)-5-piperidinoisoxazole.

3-(5-nitro-2-furyl)-5-(2-pyridyl)isoxazole with a melting point of 240 to 243° C. was obtained from 4,5-dihydro-3-(5-nitro-2-furyl)-5-piperidino-5-(2-pyridyl)isoxazole.

3-(5-nitro-2-furyl)-5-(4-pyridyl)isoxazole with a melting point of 280 to 283° C. was obtained from 4,5-dihydro-3-(5 - nitro-2-furyl)-5-piperidino-5-(4-pyridyl)isoxazole.

EXAMPLE 18

5-nitro-2-furhydroxamoyl chloride (1.9 g.) was dissolved in 60 ml. of chloroform, and 1.5 g. of 1-pyrrolidinocyclohexene and then 1.0 g. of triethyl amine were added. The reaction mixture was refluxed for 45 minutes, and the chloroform was removed by distillation. Ethanol was added to the residue and crystallization was effected. The precipitated crystals were recrystallized from ethanol to give 1.6 g. of needle-like crystals of 4,5-dihydro-3-(5-nitro-2-furyl)-5-pyrrolidino - 4,5 - tetramethyleneisoxazole with a melting point of 115 to 116° C. On concentration of the mother-liquor followed by recrystallization of the resulting crystals from ethanol-water, there was obtained 0.5 g. of needle-like crystals of 3-(5-nitro-2-furyl)-4,5-tetramethyleneisoxazole with a melting point of 125 to 127° C.

EXAMPLE 19

A solution of 0.95 g. of 5-nitro-2-furhydroxamyl chloride in 10 ml. of ether was added dropwise gradually with stirring to a 20 ml. ether solution of 0.58 g. of 1-pyrrolidino-1-propene and 0.51 g. of triethylamine while stirring. The reaction mixture was stirred for 2 hours at room temperature, washed with water and dried. The ether was removed by filtration, and methanol was added to the residue for crystallization. The resulting crude crystals were recrystallized from methanol to give 0.3 g. of 4-methyl-3-(5-nitro-2-furyl)isoxazole with a melting point of 146 to 149° C.

EXAMPLE 20

5-nitro-2-furhydroxamoyl chloride (1.9 g.) was dissolved in 50 ml. of chloroform, and 1.4 g. of 1-piperidino-1-n-butene and then 1.0 g. of trimethylamine were added. The reaction mixture was refluxed for 30 minutes, and the chloroform was removed by distallation under reduced pressure to give crude 4,5-dihydro-4-ethyl-3-(5-nitro-2-furyl)-5-piperidinoisoxazole. The crude product was added a mixture of 5 ml. of conc. hydrochloric acid and 2 ml. of ethanol, and the mixture was refluxed for 10 minutes on a steam bath. After removal of ethanol under reduced pressure, isopropanol was added to the residue. The precipitated crystals on cooling were collected by filtration, washed with water, and recrystallized from isopropanol. There was obtained 0.8 g. of 4-ethyl-3-(5-nitro-2-furyl)isoxazole with a melting point of 102 to 103° C.

EXAMPLE 21

(A) A mixture of 1.5 ml. of conc. hydrochloric acid and 2 ml. of ethanol was added to 0.2 g. of 4,5-dihydro-5-ethoxy-3-(5-nitro-2-furyl) isoxazole. The resulting mixtuer was heated for 10 minutes on a steam bath. After evaporation of ethanol, and dilution with water, the precipitated crystals, on cooling, was collected by filtration, washed with water, and recrystallized from methanol. There was obtained 0.18 g. 3-(5-nitro-2-furyl)isoxazole in colorless needle-like crystals with a melting point of 167 to 169° C.

(B) To a stirred suspension of 1.9 g. of 5-nitro-2-furhydroxamoyl chloride and 1.0 g. of vinyl acetate in 40 ml. of benzene was added a solution of 1.0 g. of triethylamine in 10 ml. of benzene at room temperature. After one hour, the mixture was warmed on a steam bath for 10 minutes to complete the reaction. The benzene solution, after drying, was subjected to the evaporation of the solvent and an excess of vinyl acetate to give 1.8 g. of a red-brown oily substance consisting of 5-acetoxy-4,5-dihydro-3-(5-nitro-2-furyl)isoxazole. To the oily substance was added a solution of 2 ml. of conc. hydrochloric acid and 5 ml. of ethanol, and the mixture was refluxed for 40 minutes on a steam bath. The resulting crystals were collected and recrystallized from methanol to give 0.7 g. of 3-(5-nitro-2-furyl)isoxazole.

(C) From 5-nitro-2-furhydroxamoyl chloride and 1-piperidinoethylene, 3-(5-nitro-2-furyl)isoxazole was prepared by the same procedures as (B).

EXAMPLE 22

5-nitro-2-furhydroxamoyl chloride (0.95 g.) was dissolved in 10 ml. of ether. While cooling, 0.5 g. of triethylamine was gradually added. The precipitated triethylamine hydrochloride was removed by filtration, and the filtrate was immediately concentrated to remove the ether at a low temperature. There was obtained 5-nitro-2-furonitrile oxide, to which was added a solution of 0.5 g. of ethyl acrylate in 20 ml. benzene, and the mixture was allowed to react for 3 hours at room temperature with stirring. The reaction mixture was washed with water, and dried with anhydrous magnesium sulfate. Thereafter, the residue was cooled and crystallized. The resulted crystals were recrystallized from isopropanolethanol. There was obtained 0.87 g. of ethyl 4,5-dihydro-3-(5-nitro-2-furyl)-5-isoxazolecarboxylate in colourless fine needle-like crystals with a melting point of 89 to 91° C.

EXAMPLE 23

5-nitro-2-furhydroxamoyl chloride (0.95 g.) was added to 30 ml. of benzene, and while cooling, a mixture of 0.5 g. of triethylamine and 10 ml. of benzene was added to form 5-nitro-2-furonitrile oxide, to which was immediately added 0.7 g. of methylvinyl ketone and the mixture was allowed to react with stirring it at room temperature for 5 hours. The reaction mixture was washed with water, and dried. Then, the solvent was removed by distillation. The resulting crude crystals were recrystallized from sopropanol to form 0.6 g. of 5-acetyl-4,5-dihydro-3-(5-nitro-2-furyl)isoxazole in colourless crystals with a melting point of 110 to 111° C.

EXAMPLE 24

Ethylvinyl ether (0.72 g.) and 0.5 g. of triethylamine were added to 20 ml. of benzene, and while stirring, a suspension of 0.95 g. of 5-nitro-2-furhydroxamoyl chloride in 10 ml. of benzene was added dropwise gradually. The mixture was further stirred at room temperature for 5 hours. The reaction mixture was washed with water and dried. The benzene was removed by distillation. The residue was cooled, and the resulting crystals were recrystallized from isopropanol. There was obtained 0.75 g. of 4,5-dihydro-5-ethoxy-3-(5-nitro-2-furyl)isoxazole in colourless crystals with a melting point of 85 to 86° C.

EXAMPLE 25

One gram of triethylamine was adde to a mixture of 1.9 g. of 5-nitro-2-furhydroxamoyl chloride and 1.72 g. of diethyl maleate, and the resulting mixture was allowed to react at room temperature for 6 hours. The reaction mixture was washed with water and dried. After evaporation of the solvent and the unchanged diethyl maleate under reduced pressure, the residue was subjected to alumina chromatography. Thus elution with benzene gave an oily substance, which was distilled at 160 to 165° C. (bath temperature) under a pressure of 0.001 mm. Hg to give 1.0 g. of an oily substance of ethyl 4,5-dihydro-3-(5-nitro-2-furyl)-4,5-isoxazoledicarboxylate with a refractive index $(n_D^{20})$ of 1.5522.

In the same manner as above, 1.1 g. of an oily substance of ethyl 4,5-dihydro-3-(5-nitro-2-furyl)-5-phenyl-4-isoxazolecarboxylate with a refractive index $(n_D^{20})$ of 1.6068 was prepared from 1.76 g. of ethyl cinnamate and 5-nitro-2-furonitrile oxide produced from 1.9 g. of 5-nitro-2-furhydroxamoyl chloride.

EXAMPLE 26

Triethylamine (0.5 g.) was added to a solution of 0.95 g. of 5-nitro-2-furhydroxamyl chloride and 0.77 g. of acryl chloride in 30 ml. chloroform, and the mixture was heated under reflux for 30 minutes. After cooling, the reaction mixture was washed with water and dried. Chloroform was removed by distillation, and the residual crystals were recrystallized from ethanol. There was obtained 0.8 g. of 5-chloromethyl-4,5-dihydro-3-(5-nitro-2-furyl)isoxazole in pale yellow crystals with a melting point of 101 to 102° C.

EXAMPLE 27

5-nitro-2-furhydroxamoyl chloride (0.95 g.) and 0.6 g. of 2-vinylpyridine were added to 30 ml. of benzene, and while stirring at room temperature, 0.5 g. of triethylamine was added dropwise gradually. After stirring further for 5 hours at room temperature, the reaction mixture was washed with water, and dried. The solvent was removed by distillation, and the obtained crude crystals were recrystallized from methanol. There was obtained 0.89 g. of 4,5 - dihydro-3-(5-nitro-2-furyl)-5-(2-pyridyl)isoxazole in pale yellow with a melting point of 138 to 139° C.

The following compounds were prepared from different starting materials.

4,5-dihydro-3-(5-nitro-2-furyl) - 5-isoxazolecarbonamide with a melting point of 220 to 221° C. was obtained from 5-nitro-2-furonitrileoxide and acrylamide.

5-cyanomethyl-4,5-dihydro-3-(5-nitro-2-furyl)isoxazole with a melting point of 147 to 148° C. was obtained from 5-nitro-2-furonitrileoxide and acrylonitrile.

4,5 - dihydro - 5 - methyl - 3 - (5 - nitro - 2 - furyl)-5-isoxazolecarbonamide with a melting point of 203 to 205° C. was obtained from 5-nitro-2-furonitrileoxide and methacrylamide.

4,5 - dihydro - 5 - (2,3 - epoxypropyloxy)methylisoxazole with a melting point of 69 to 72° C. was obtained from 5-nitro-2-furonitrileoxide and allylglycidyl ether.

4,5 - dihydro - 5 - (2 - methyl - 5 - pyridyl) - 3 - (5-nitro-2-furyl)isoxazole with a melting point of 144 to 145° C. was obtained from 5-nitro-2-furonitrileoxide and 2-methyl-5-vinylpyridine.

4,5-dihydro - 3 - (5-nitro-2-furyl)-5-(4-pyridyl)isoxazole with a melting point of 168 to 171° C. was obtained from 5-nitro-2-furonitrileoxide and 4-vinylpyridine.

4,5-dihydro - 3 - (5 - nitro-2-furyl)-5-phenylisoxazole with a melting point of 129 to 130° C. was obtained from 5-nitro-2-furonitrileoxide and styrene.

5-diethylamino - 4,5 - dihydro - 4 - ethyl-3-(5-nitro-2-furyl)isoxazole with a melting point of 62 to 63° C. was obtained from 5-nitro-2-furonitrileoxide and 1-diethylamino-1-butene.

5-diethylamino-4,5-dihydro - 3 - (5-nitro-2-furyl)-4,5-tetramethyleneisoxazole with a melting point of 111 to 113° C. was obtained from 5-nitro-2-furonitrileoxide and 1-diethylamino-1-cyclohexene.

4,5-dihydro - 4,4 - dimethyl - 3 - (5-nitro-2-furyl)-5-piperidinoisoxazole with a melting point of 121 to 124° C. was obtained from 5-nitro-2-furonitrileoxide and 1-piperidino-2-methyl-1-propene.

3-(5-nitro - 2 - furyl)tetrahydropyrano[3,2-d]-2-isoxazoline with a melting point of 125 to 126° C. was obtained from 5-nitro-2-furonitrileoxide and 3,4-dihydro-2H-pyrane.

4,6-dioxo-3-(5-nitro - 2 - furyl) - 5 - phenyl-pyrrolidino-[3,4-1]-2-isoxazoline with a melting point of 245 to 246° C. was obtained from 5-nitro-2-furonitrileoxide and N-phenylmaleimide.

5-methyl-3-(5-nitro-2-furyl) - 4 - phenylcarbamoylisoxazole with a melting point of 208 to 210° C. was obtained from 5-nitro-2-furonitrileoxide and beta-morpholino-N-phenylcrotonamide.

EXAMPLE 28

Acetic anhydride (1 ml.) and 12 ml. of ethyl ortho-formate were added to 1.0 g. of 5-amino-3-(5-nitro-2-furyl)-4-isoxazolecarbonitrile, and the mixture was refluxed for 4 hours. At the end of the reaction, excess ethyl ortho-formate and acetic anhydride were removed by distillation under reduced pressure. The residue was dissolved in chloroform, washed with water, and dried. The chloroform was removed by distillation, and the obtained crystals were recrystallized from anhydrous benzene. There was obtained 0.96 g. of 5-ethoxymethyleneamino-3-(5-nitro-2-furyl)-4-isoxazolecarbonitrile with a melting point of 121 to 122° C.

EXAMPLE 29

5-amino-3-(5-nitro-2-furyl) - 4 - isoxazolecarbonitrile (1.0 g.) was added to 3 ml. of conc. sulphuric acid, and dissolved by heating the mixture for 5 minutes on a steam bath. The reaction mixture was cooled to room temperature and then put onto crushed ice. The precipitate was collected by filtration, washed thoroughly with water, and recrystallized from methanol-acetone. There was obtained 0.95 g. a yellow needle-like crystals of 5-amino-3-(5-nitro-2-furyl)-4-isoxazolecarbonamide with a melting point of 219 to 221° C. (decomposition).

EXAMPLE 30

Ethyl ortho-formate (3 ml.) and 0.5 ml .of acetic anhydride were added to 150 mg. of 5-amino-3-(5-nitro-2-furyl)-4-isoxazolecarbonamide. The mixture was mildly refluxed for 1.5 hours. The excess ethyl orthoformate and acetic anhydride were removed by distillation under reduced pressure. The residual crystalline substance was washed with water, and recrystallized from ethanol-acetone. There was obtained 130 mg. of colourless prism crystals of 4,5-dihydro-3-(5-nitro-2-furyl)-4-oxoisoxazolo[5,4-d]pyrimidine with a melting point of above 250° C.

EXAMPLE 31 p-Toluenesulphonic acid (0.2 g.) and 20 ml. of isopropenyl acetate were added to 0.5 g. of 5-amino-3-(5-nitro-2-furyl)-4-isoxazolecarbonitrile. The mixture was mildly refluxed for 3 hours. The excess isopropenyl acetate was removed by distillation. The obtained crystalline residue was washed with water and recrystallized from methanol. There was obtained 0.3 g. of pale yellow needle-like crystals of 5-acetamido-3-(5-nitro-2-furyl)-4-isoxazolecarbonitrile with a melting point of 237 to 239° C.

EXAMPLE 32

Acetic anhydride (30 ml.) and 0.3 g. of p-toluenesulphonic acid were added to 1.0 g. of 5-amino-3-(5-nitro-2-furyl)-4-isoxazolecarbonitrile. The mixture was refluxed for 2 hours. The acetic anhydride was removed by distillation. The residue was washed with water, and then recrystallized from acetone. There was obtained 0.25 g. of 4,5 - dihydro-6-methyl-3-(5-nitro-2-furyl)-4-oxoisoxazolo[5,4-d]pyrimidine with a melting point of above 250° C.

The mother liquor was concentrated and cooled. The obtained crystals were recrystallized from methanol to give 140 mg. of 5-acetamido-3-(5-nitro-2-furyl)-4-isoxazolecarbonitrile.

EXAMPLE 33

Acetic anhydride (10 ml.) and 0.05 g. of p-toluenesulphonic acid were added to 0.15 g. of 5-amino-3-(5-nitro-2-furyl)-4-isoxazolecarbonamide. The mixture was refluxed for 1 hour. The acetic anhydride was removed by distillation. The residue was washed with water and recrystallized from acetone. There was obtained 0.1 g. of 4,5-dihydro-6-methyl-3-,5-nitro-2-furyl) - 4 - oxoisoxazolo[5,4-d]pyrimidine with a melting point above 250° C.

EXAMPLE 34

Acetic anhydride (15 ml.) and 0.15 g. of p-toluenesulphonic acid were added to 0.5 g. of ethyl 5-amino-3-(5-nitro-2-furyl)-4-isoxazolecarboxylate. The mixture was refluxed for 2 hours. The excess acetic anhydride was removed by distillation under reduced pressure. The residue was dissolved in chloroform and the solution was washed with water and dried. The chloroform was removed by distillation and the residual crystalline substance was recrystallized from methanol. There was obtained 0.34 g. of colourless needle-like crystals of ethyl 5-acetamide-3-(5-nitro-2-furyl) - 4 - isoxazolecarboxylate with a melting point of 168 to 169° C.

EXAMPLE 35

4,5 - dihydro-3-(5-nitro-2-furyl)-5-(2-pyridyl)isoxazole (130 mg.) and 110 mg. of N-bromosuccinimide were suspended into 20 ml. of carbon tetrachloride. To the suspension, 2 mg. of dibenzoyl peroxide was added. The mixture was then refluxed for 10 hours. The solvent was removed by distillation. The crystalline residue was repeatedly extracted with a 15% hydrochloric acid solution. The extract was collected and neutralized with aqueous ammonia. The precipitated crystals were collected by filtration, washed with water and recrystallized from methanol-acetone. There was obtained 70 mg. of colourless needle-like crystals of 3-(5-nitro-2-furyl)-5-(2-pyridyl)isoxazole with a melting point of 240 to 243° C.

The following compounds were prepared from different starting materials.

3-(5-nitro-2-furyl)-5-(4-pyridyl)isoxazole with a melting point of 280 to 283° C. was obtained from 4,5-dihydro-3-(5-nitro-2-furyl)-5-(4-pyridyl)isoxazole.

3-(5-nitro-2-furyl)-5-phenylisoxazole with a melting point of 204 to 205° was obtained from 4,5-dihydro-3-(5-nitro-2-furyl)-5-phenylisoxazole.

What is claimed is:

1. A 3-(5-nitro-2-furyl) isoxazoline derivative represented by the formula:

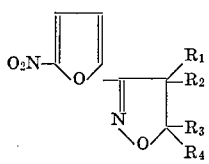

wherein $R_1$ represents a member selected from the groups consisting of hydrogen, benzyl, lower alkyl and lower alkoxycarbonyl; $R_2$ represents hydrogen or a lower alkyl group; $R_3$ represents a member selected from the group consisting of hydrogen,

(wherein R' and R" represent lower alkyl and R' and R" together with the nitrogen atom may form a heterocyclic ring selected from pyrrolidino, piperidino and morpholino), lower alkyl and lower alkoxy; $R_4$ represents a member selected from the groups consisting of hydrogen, lower alkyl, carbamoyl, lower alkanoyl, phenyl, cyanomethyl, chloromethyl, pyridine, methyl pyridine, lower alkoxycarbonyl and

$R_1$ and $R_4$ together may form a bridge selected from the groups consisting of $-(CH_2)_3-$, $-(CH_2)_4-$, $-(CH_2)_3O-$ and

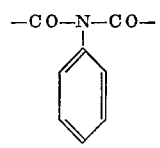

2. The 3-(5-nitro-2-furyl)isoxazoline derivative of claim 1 wherein the compound is 4,5-dihydro-5-morpholino-3-(5-nitro-2-furyl)-4,5-tetramethyleneisoxazole.

3. The 3-(5-nitro-2-furyl)isoxazoline derivative of claim 1 wherein the compound is 4,5-dihydro-3-(5-nitro-2-furyl)-5-piperidino-4,5-tetramethyleneisoxazole.

4. The 3-(5-nitro-2-furyl)isoxazoline derivative of claim 1 wherein the compound is 4,5-dihydro-3-(5-nitro-2-furyl)-5-pyrrolidino-4,5-tetramethyleneisoxazole.

5. The 3-(5-nitro-2-furyl)isoxazoline derivative of claim 1 wherein the compound is 4,5-dihydro-3-(5-nitro-2-furyl)-5-piperidino-4,5-tetramethyleneisoxazole hydrochloride.

6. The 3-(5-nitro-2-furyl)isoxazoline derivative of claim 1 wherein the compound is 4,5-dihydro-3-(5-nitro-2-furyl)-5-pyrrolidino-4,5-trimethyleneisoxazole.

7. The 3-(5-nitro-2-furyl)isoxazoline derivative of claim 1 wherein the compound is 5-diethylamino-4,5-dihydro-3-(5-nitro-2-furyl)-4,5-tetramethyleneisoxazole.

8. The 3-(5-nitro-2-furyl)isoxazoline derivative of claim 1 wherein the compound is 8,9-dihydro-3-(5-nitro-2-furyl)-tetrahydropyrano[3,2-d]isoxazole.

9. The 3-(5-nitro-2-furyl)isoxazoline derivative of claim 1 wherein the compound is 7,8-dihydro-4,6-dioxo-3-(5-nitro-2-furyl)-5-phenyl-pyrrolidino[3,4-d]isoxazole.

10. The 3-(5-nitro-2-furyl)isoxazoline derivative of claim 1 wherein the compound is 4,5-dihydro-3-(5-nitro-2-furyl)-5-phenyl-5-piperidinoisoxazole.

11. The 3-(5-nitro-2-furyl)isoxazoline derivative of claim 1 wherein the compound is 4,5-dihydro-5-ethyl-4-methyl-5-morpholino-3-(5-nitro-2-furyl)isoxazole.

12. The 3-(5-nitro-2-furyl)isoxazoline derivative of claim 1 wherein the compound is 4,5-dihydro-5-morpholino-3-(5-nitro-2-furyl)-5-(3-pyridyl)isoxazole.

13. The 3-(5-nitro-2-furyl)isoxazoline derivative of claim 1 wherein the compound is 4,5-dihydro-3-(5-nitro-2-furyl)-4-phenyl-5-piperidinoisoxazole.

14. The 3-(5-nitro-2-furyl)isoxazoline derivative of claim 1 wherein the compound is 4-benzyl-4,5-dihydro-5-morpholino-3-(5-nitro-2-furyl)isoxazole.

15. The 3-(5-nitro-2-furyl)isoxazoline derivative of claim 1 wherein the compound is 4,5-dihydro-4,4-dimethyl-3-(5-nitro-2-furyl)-5-piperidinoisoxazole.

16. The 3-(5-nitro-2-furyl)isoxazoline derivative of claim 1 wherein the compound is 5-diethylamino-4,5-dihydro-4-ethyl-3-(5-nitro-2-furyl)isoxazole.

17. The 3-(5-nitro-2-furyl)isoxazoline derivative of claim 1 wherein the compound is 4,5-dihydro-4-methyl-3-(5-nitro-2-furyl)-5-piperidinoisoxazole.

18. The 3-(5-nitro-2-furyl)isoxazoline derivative of claim 1 wherein the compound is 4,5-dihydro-5-isobutyl-3-(5-nitro-2-furyl)-5-pyrrolidinoisoxazole.

19. The 3-(5-nitro-2-furyl)isoxazoline derivative of claim 1 wherein the compound is 4,5-dihydro-5-ethyl-3-(5-nitro-2-furyl)-5-piperidinoisoxazole.

20. The 3-(5-nitro-2-furyl)isoxazoline derivative of claim 1 wherein the compound is 4,5-dihydro-3-(5-nitro-2-furyl)-5-piperidino-5-(2-pyridyl)isoxazole.

21. The 3-(5-nitro-2-furyl)isoxazoline derivative of claim 1 wherein the compound is 4,5-dihydro-3-(5-nitro-2-furyl)-5-piperidino-5-(4-pyridyl)isoxazole.

22. The 3-(5-nitro-2-furyl)isoxazoline derivative of claim 1 wherein the compound is 4,5-dihydro-3-(5-nitro-2-furyl)-5-isoxazolecarbonamide.

23. The 3-(5-nitro-2-furyl)isoxazoline derivative of claim 1 wherein the compound is ethyl 4,5-dihydro-3-(5-nitro-2-furyl)-5-isoxazolecarboxylate.

24. The 3 - (5-nitro-2-furyl)isoxazoline derivative of claim 1 wherein the compound is 4,5-dihydro-5-ethoxy-3-(5-nitro-2-furyl)isoxazole.

25. The 3-(5-nitro-2-furyl)isoxazoline derivative of claim 1 wherein the compound is 5-acetyl-4,5-dihydro-3-(5-nitro-2-furyl)isoxazole.

26. The 3-(5-nitro-2-furyl)isoxazoline derivative of claim 1 wherein the compound is 5-cyanomethyl-4,5-dihydro-3-(5-nitro-2-furyl)isoxazole.

27. The 3-(5-nitro-2-furyl)isoxazoline derivative of claim 1 wherein the compound is 5-chloromethyl-4,5-dihydro-3-(5-nitro-2-furyl)isoxazole.

28. The 3-(5-nitro-2-furyl)isoxazoline derivative of claim 1 wherein the compound is 4,5-dihydro-3-(5-nitro-2-furyl)-5-phenylisoxazole.

29. The 3-(5-nitro-2-furyl)isoxazoline derivative of claim 1 wherein the compound is 4,5-dihydro-5-(2,3-epoxypropyloxymethyl)-3-(5-nitro-2-furyl)isoxazole.

30. The 3-(5-nitro-2-furyl)isoxazoline derivative of claim 1 wherein the compound is 4,5-dihydro-5-methyl-3-(5-nitro-2-furyl)-5-isoxazolecarbonamide.

31. The 3-(5-nitro-2-furyl)isoxazoline derivative of claim 1 wherein the compound is ethyl 4,5-dihydro-3-(5-nitro-2-furyl)-4,5-isoxazoledicarboxylate.

32. The 3-(5-nitro-2-furyl)isoxazoline derivative of claim 1 wherein the compound is 4,5-dihydro-5-(2-methyl-5-pyridyl)-3-(5-nitro-2-furyl)isoxazole.

33. The 3-(5-nitro-2-furyl)isoxazoline derivative of claim 1 wherein the compound is 4,5-dihydro-3-(5-nitro-2-furyl)-5-(2-pyridyl)isoxazole.

34. The 3-(5-nitro-2-furyl)isoxazoline derivative of claim 1 wherein the compound is 4,5-dihydro-3-(5-nitro-2-furyl)-5-(4-pyridyl)isoxazole.

35. The 3-(5-nitro-2-furyl)isoxazoline derivative of claim 1 wherein the compound is ethyl 4,5-dihydro-3-(5-nitro-2-furyl)-5-phenyl-4-isoxazolecarboxylate.

References Cited

UNITED STATES PATENTS 3,410,860   11/1968   Haber et al. _____ 260—307

FOREIGN PATENTS 1,040,551   9/1966   Great Britain _____ 260—308

OTHER REFERENCES

Doyle et al., J. Chem. Soc. (London), 1963, pp. 5845–5854.

AITON D. ROLLINS, Primary Examiner

U.S. Cl. X.R.

260—247.2 A, 247.2 B, 256.4 R, 256.4 F, 287 R, 288 R, 294 A, 294.3 E, 294.7 D, 295 R, 295 K, 296 R, 302 H, 304, 307 D, 307 F; 424—248, 263, 267, 272

UNITED STATES PATENT OFFICE

CERTIFICATE OF CORRECTION

Patent No. 3,631,169      Dated December 28, 1971

Inventor(s) MINAMI ET AL

It is certified that error appears in the above-identified patent and that said Letters Patent are hereby corrected as shown below:

Page 1, column 2, line 6, delete "$C_2N$" and insert -- $O_2N$ --.

Page 2, column 3, first entry in table under compound, delete "isoxaazolecarbonamide" and insert -- isoxazolecarbonamide --.

Page 2, column 4, fourth entry under Salmonella typhimurium, delete "0.2" and insert -- 0.3 -- .

Page 2, column 4, fourth entry under Klebsiella pneumoniae, delete "0.2" and insert -- 0.1 -- .

Page 2, column 4, eleventh entry under Klebsiella pneumoniae, delete "0.22" and insert -- 0.3 --.

Page 2, column 4, last heading under Organism, delete "Trichomonas vaginali" and insert -- Trichomonas vaginalis -- .

Page 3, column 6, in the formula between lines 57-73, delete the formula

- to be continued -

UNITED STATES PATENT OFFICE
CERTIFICATE OF CORRECTION

Patent No. 3,631,169    Dated December 28, 1971

Inventor(s) MINAMI ET AL

It is certified that error appears in the above-identified patent and that said Letters Patent are hereby corrected as shown below:

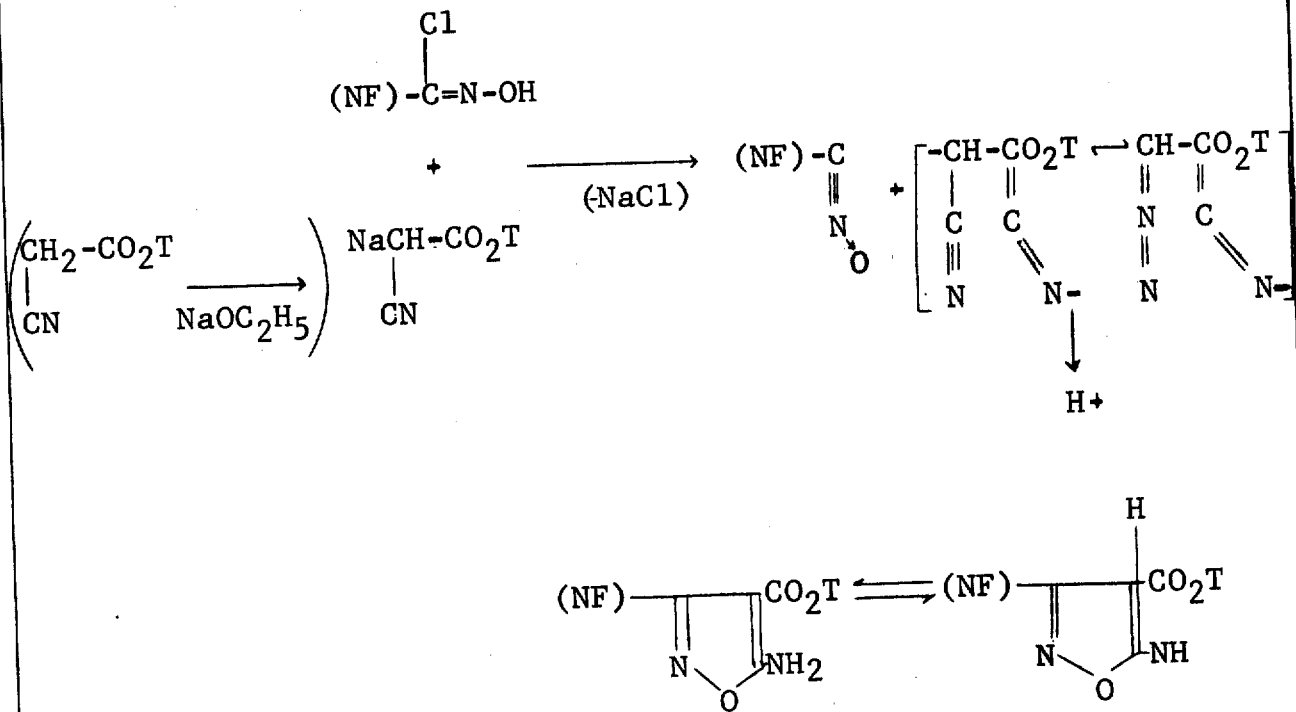

and insert the following formula

- to be continued -

UNITED STATES PATENT OFFICE
CERTIFICATE OF CORRECTION

Patent No. 3,631,169      Dated December 28, 1971

Inventor(s) MINAMI ET AL

It is certified that error appears in the above-identified patent and that said Letters Patent are hereby corrected as shown below:

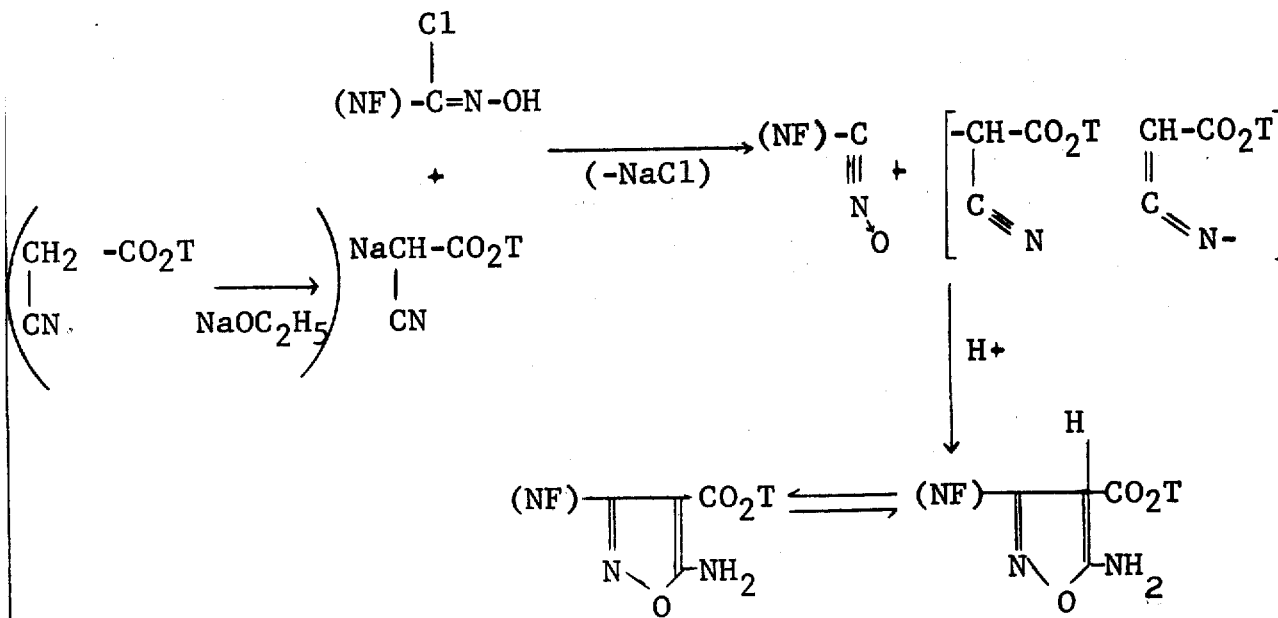

Page 4, column 7, delete the formula between lines 48-54

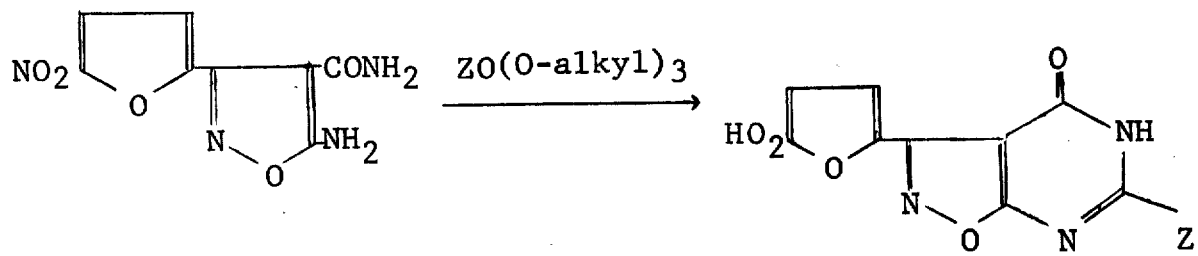

UNITED STATES PATENT OFFICE
CERTIFICATE OF CORRECTION

Patent No. 3,631,169          Dated December 28, 1971

Inventor(s) MINAMI ET AL

It is certified that error appears in the above-identified patent and that said Letters Patent are hereby corrected as shown below:

and insert the following formula

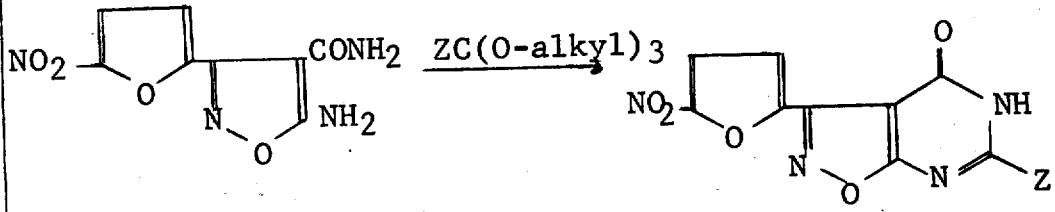

Page 4, column 8, the formula between lines 35-45, delete the double bond between the nitro group and furyl ring and insert a single bond.

Signed and sealed this 30th day of May 1972.

(SEAL)
Attest:

EDWARD M. FLETCHER, JR.
Attesting Officer

ROBERT GOTTSCHALK
Commissioner of Patents